July 21, 1959          D. OLEKSIJ          2,895,765
RETRACTIBLE RIGID AUTOMOBILE TOP
Filed Nov. 8, 1956          2 Sheets-Sheet 2
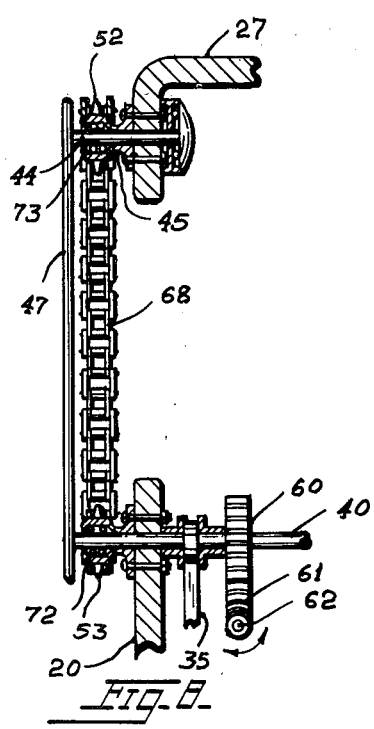
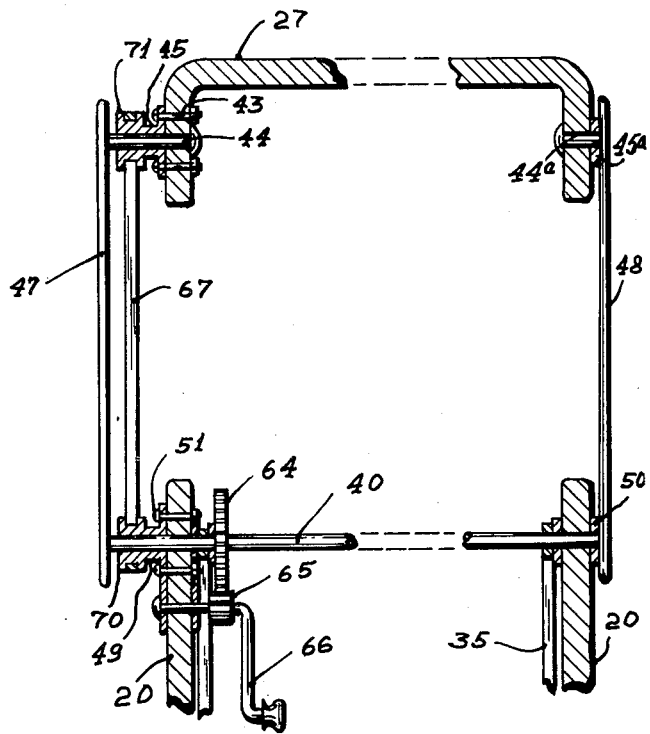
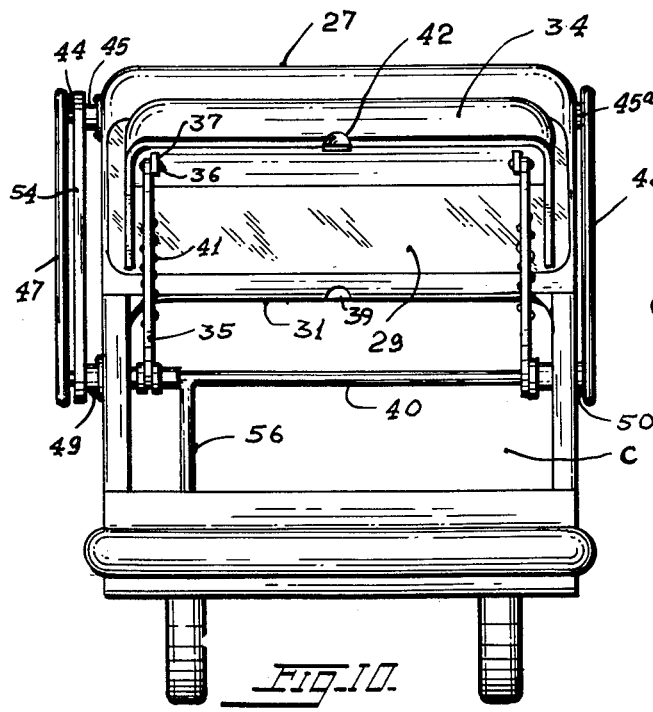
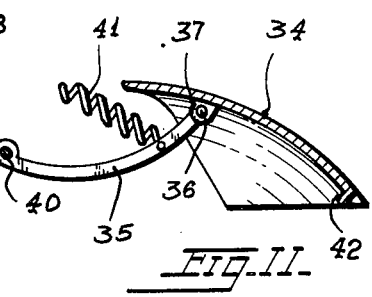
INVENTOR.
DIMITRIJ OLEKSIJ
BY
ATTORNEY

United States Patent Office 2,895,765
Patented July 21, 1959

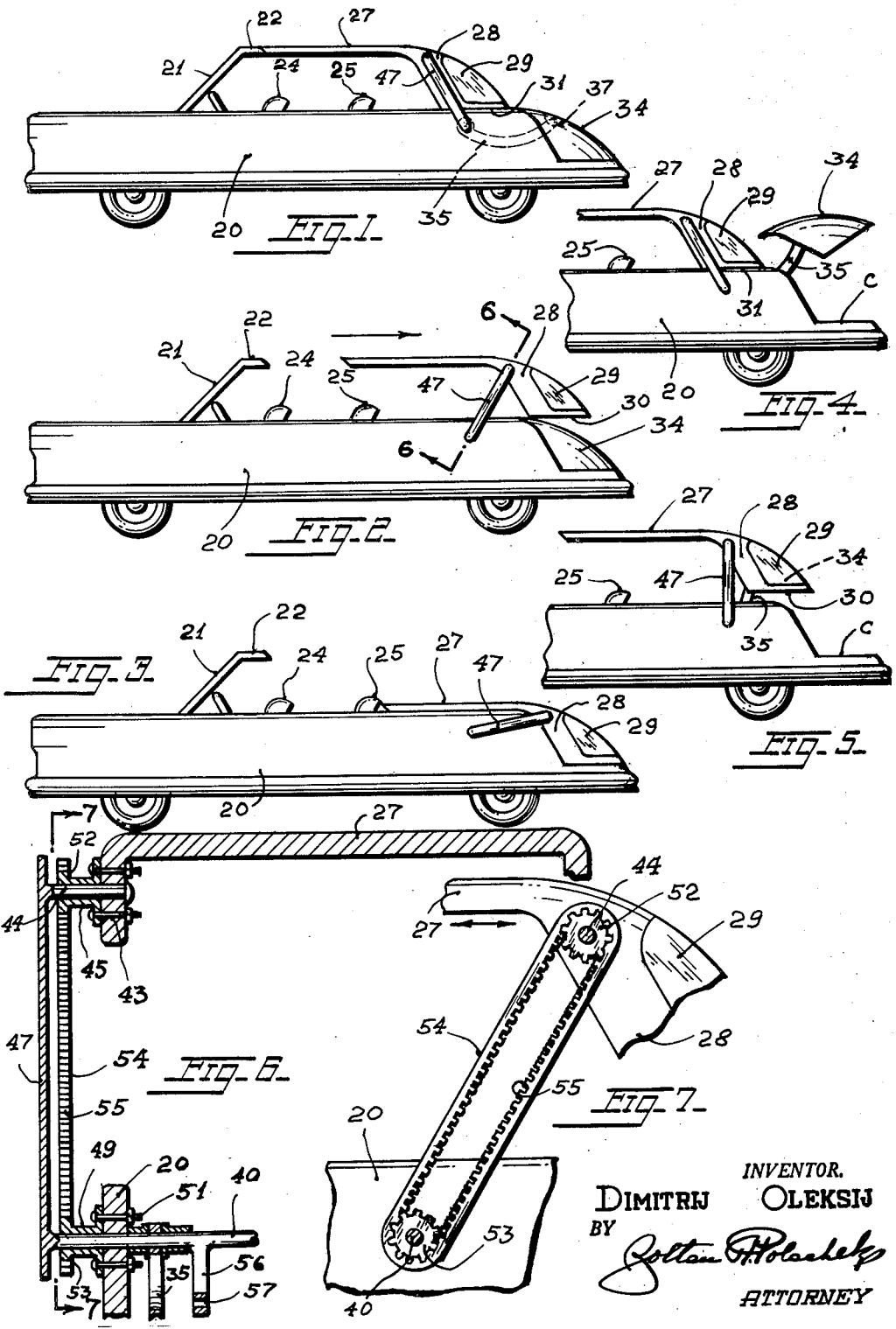

2,895,765
RETRACTIBLE RIGID AUTOMOBILE TOP

Dimitrij Oleksij, East Orange, N.J.

Application November 8, 1956, Serial No. 621,165

3 Claims. (Cl. 296—117)

This invention relates to the art of automobile bodies and particularly concerns a convertible automobile body having a hard top.

In modern automobile styling a trend in consumer preference has developed for the long low sweeping lines characteristic of the sport model convertible type of body. This type of body has heretofore included a collapsible top made of suitable reinforced fabric so that the top may be retracted. Lately automobile bodies have been manufactured with the same general low sweeping lines of the conventional sport model convertible type but with a permanent hard or rigid top. This top has not been retractible. It has been known heretofore to slide certain portions of hard top automobiles into the bodies for various purposes but it has never heretofore been possible to retract substantially the entire hard top.

It is therefore a principal object of the invention to provide a sport type convertible automobile with a retractible hard top.

It is a further object to provide a retractible hard top for an automobile with means for nesting the hard top on the rear trunk door of the automobile body.

It is a further object to provide a convertible automobile with a retractible hard top which can be nested on the rear trunk door of the automobile body and which is pivotable with the door so that the door can be opened while the top remains retracted.

It is a further object to provide a convertible automobile body of the type described with an endles belt or chain mechanism for controlling the retraction and replacement of the hard top thereof.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevational view of a hard top convertible automobile embodying the invention with the top and trunk door in closed position.

Fig. 2 is a view similar to Fig. 1 with the top partly retracted.

Fig. 3 is a further side elevational view showing the top fully retracted and nested on the trunk door.

Fig. 4 is a fragmentary side elevational view showing the trunk door in open position.

Fig. 5 is a fragmentary side elevational view showing the trunk door open and nested in the partly retracted roof top.

Fig. 6 is an enlarged sectional view taken on lines 6—6 of Fig. 2 and showing details of the retraction mechanism for the top of the automobile body.

Fig. 7 is a sectional view taken on lines 7—7 of Fig. 6 showing further details of the retraction mechanism.

Figs. 8 and 9 are rear elevational views of other forms of top retraction mechanism.

Fig. 10 is a rear view of the automobile with trunk door open.

Fig. 11 is a central sectional view of the trunk door showing structural details thereof.

In Figs. 1–5 is shown an automobile body 20 having a front windshield 21 with an overhanging backwardly extending roof portion 22. The body has side windows which are retracted into the body 20 in conventional fashion and are thus not shown in the drawing. The automobile has a front seat 24 and a rear seat 25. Disposed over the body is a hard top or solid roof 27. The forward end of the roof abuts the end of the fixed rearwardly extending roof portion 22. The rear portion 28 of the roof is formed as a shell-like open frame in which is mounted the rear window 29. The lower end 30 of the roof rests on a rear fixed portion 31 of the body, best shown in Fig. 10. At the rear of the body is a trunk compartment C closed by a trunk door 34. The door is a hollow shell-like structure having an outer curvature substantially corresponding to the inner curvature of the roof portion 28.

The trunk door is pivotally attached to a pair of curved arms 35. As shown in Figs. 10 and 11, the arms 35 are attached at one end by pins 36 to tabs or bracket ears 37 on the inside of the door. The other ends of the arms 35 are pivotally mounted on shaft 40. Springs 41 are attached between the arms 35 and the body portion 31 at the rear of body 20 to retain the door in a closed and open position, as desired. An inwardly extending finger grip portion 42 is formed on the outermost end of the trunk door for convenience in opening the door.

The roof top 27 is carried on a pair of short shafts 44, 44a best shown in Figs. 6, 8, 9 and 10. The shafts are journalled in the cylindrical bearing members 45 and 45a secured by bolts 43 to opposite sides at upper ends of the rear roof portion 28. Shafts 44, 44a are secured to upper ends of flat arms 47, 48 respectively. The lower ends of arms 47, 48 are connected to shaft 40. Shaft 40 is pivotally mounted in the fixed cylindrical bearings 49, 50 attached by bolts 51 to the body 20. Bearings 45 and 49, as shown in Fig. 6, have their outer ends formed as circular sprockets or cog wheels 52, 53. An endless flexible belt 54 extends around the sprocket wheels with teeth 55 of the belt engaged in teeth of the sprocket wheels as shown in Figs. 6 and 7. A crankshaft 56 extends perpendicularly to the shaft 40 and has an eye 57 for engagement with a suitable drive means. This drive means may be a power take-off of the motor of the automobile, a separate electric or hydraulic motor or a hand-driven crank.

In Fig. 8 the shaft 40 is provided with a worm wheel 60 instead of crank 56. The worm wheel is in engagement with and is driven by a worm 61 carried on a shaft 62 operatively connected to a suitable power take-off from the motor of the automobile. In Fig. 9 a spur gear 64 is mounted on shaft 40 and is disposed to engage the pinion gear 65 carried by crank 66 journalled in the body 20.

An endless chain 68 may be used instead of belt 54. This chain passes over the cogged wheels 52, 53 in a manner similar to belt 54, as shown in Fig. 8. An endless flexible steel cable or leather belt 67 may be used instead of belt 54 or chain 68, as shown in Fig. 9. This belt passes over grooves in pulleys 70, 71 formed on the ends of cylindrical bearings 49 and 45, respectively.

If desired, ball bearings 72 may be provided between shaft 40 and the cog or sprocket wheel 53, as shown in Fig. 8. Similar bearings 73 may be disposed in bearing races in wheel 52 to facilitate turning of cylindrical shaft 44.

Successive steps in opening and closing the roof 27 are shown in Figs. 1, 2 and 3. In Fig. 1 the roof and trunk are both in closed positions. In Fig. 2 the shaft 40 has rotated the arms 47, 48 to a position about thirty degrees from a vertical plane. It will be noted that the roof 27 moves in an arc but remains substantially horizontal during this movement. This occurs because the endless belts or chains engage successive portions of wheels 52, while corresponding portions of wheels 53 are disengaged. Fig. 5 shows a position of the roof where the arms 47, 48 have been rotated to a vertical position. During all of this movement the roof 27 remains horizontal. The weight of the roof is distributed so that the shafts 44, 44a are located axially on the center of gravity of the roof. Thus the weight of portion 28 with window 29 balances the front part of the roof.

In Fig. 3 the roof 27 has been fully retracted so that the hollow end 28 is nested on and encloses the trunk door 34. If it is desired to open the trunk door while the roof is closed, then the door may be lifted by finger grip portion 42 and the door will be pivoted open as shown in Fig. 4. Springs 41 will hold the door open. If it is desired to open the door 34 while the roof 27 is retracted, the finger grip 42 may be reached through the recess 39 located at the lower end of roof portion 28 shown in Fig. 10. This recess overlies the finger grip 42. When the trunk door is raised manually, roof 27 pivots and rises therewith to the position shown in Fig. 5 with springs 41 holding both the roof and trunk door open. The trunk door remains nested within the roof portion 28. A slight pivotal movement of the trunk door takes place in arms 35 as the arms 47, 48 rise to a vertical position as shown in Fig. 5. The rear trunk compartment C is left wholly clear when the trunk door is opened either with or without roof 27. The belt and chain mechanisms of Figs. 8 and 9 operate in a manner similar to the endless belt 54 of Fig. 6.

There has thus been disclosed a means for converting a hard top automobile body to a sport type model in a safe, efficient, and practical manner. When the roof top is open it is retracted in a snug fitting, attractive manner on the rear of the body and may readily be closed by manual means or by any suitable power take-off.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A sport type convertible automobile, comprising a body, a rigid retractible roof top having forward and rear portions, said body having a windshield portion abutting said forward portion when the top is closed over the body, a pair of bearings mounted in axial alignment on opposite sides of the rear portion of the roof top, a pair of arms having one end journaled on said bearings respectively, the other ends of said arms being journaled on an axis on opposite sides of the body adjacent the rear thereof, a pair of wheels disposed at one end of one of said arms and at one end of said axis, an endless member passing over said wheels to retract and extend the roof top while retaining the roof top in a horizontal balanced position, drive means operatively connected to said wheels for driving said member, a trunk door disposed at the rear of the body over a compartment therein, a pair of short arms pivotally attached between said door and a rear portion of the body, and spring means attached between said short arms and the rear portion of the body for holding the door selectively in open and closed positions, said rear portion of the top being curved, said door having an outer curvature conforming to the inner curvature of the rear portion of the top so that the door nests snugly within the top when the top is retracted, said door and top being pivotable together on the short arms to open said compartment with said spring means then holding the top and door open in a raised position.

2. A sport type convertible automobile, comprising a body, a rigid retractible roof top having forward and rear portions, said body having a windshield portion abutting said forward portion when the top is closed over the body, a pair of arms having inwardly extending short shafts on one end, another shaft attached to the other end of each arm, a first pair of bearings attached to opposite sides of the rear portion of said top, said short shafts being journaled in said bearings and extending in axial alignment through the center of gravity of said roof top, another pair of bearings attached to opposite sides of said body adjacent the rear thereof, said other shaft being journaled in said other bearings, a pair of drive wheels formed respectively on one of said first pair of bearings and on one of said other bearings, an endless drive member passing over said drive wheels to retract the roof top and retain the roof top in a horizontal balanced position during retraction thereof, drive means operatively connected to said other shaft for limited angular rotation thereof, a trunk door disposed at the rear of said body over a compartment therein, a pair of other arms pivotally attached adjacent their ends to said door and said other shaft respectively, and spring means attached to said other arms and a portion of said body for holding the door selectively in open and closed positions, the rear portion of said top having a curved hollow shell-like depending section, said door being a curved hollow shell-like member having an outer curvature conforming to the inner curvature of said depending section so that the rear portion of the retractible top seats snugly on the door when the top is retracted.

3. A sport type convertible automobile, comprising a body, a rigid retractible roof top having forward and rear portions, said body having a windshield with a fixed rearwardly extending portion abutting the free end of said forward portion when the top is closed over the body, a pair of flat arms having inwardly extending short supporting shafts axially aligned on one end, another shaft attached to the other end of each arm, a pair of cylindrical bearings attached to opposite sides of the rear portion of said top, said short shafts being journaled in said bearings and extending axially through the center of gravity of said roof top, another pair of bearings attached to opposite sides of said body adjacent the rear thereof, said other shaft being journaled in said other bearings, a pair of cog wheels formed respectively on one of the cylindrical bearings and on one of said other bearings, an endless toothed member passing over said cog wheels to retract the roof top while retaining said top in a horizontal balanced position during retraction thereof, drive means operatively connected to said other shaft for limited angular rotation thereof, a trunk door disposed at the rear of said body over a compartment therein, a pair of curved arms pivotally attached adjacent their ends to said door and said other shaft respectively, and spring means attached between the ends of said curved arms and a rear end portion of said body for holding the door selectively in open and closed positions, the rear portion of said top having a curved hollow shell-like depending section, said door being a curved hollow shell-like member having an outer curvature conforming to the inner curvature of said depending section so that the rear portion of the retractible top seats snugly on the door when the top is retracted.

References Cited in the file of this patent

UNITED STATES PATENTS

| | | |
|---|---|---|
| 1,379,906 | Ellerback | May 31, 1921 |
| 2,051,140 | Grimston | Aug. 18, 1936 |
| 2,215,363 | Rupple et al. | Sept. 17, 1940 |
| 2,462,667 | O'Neal | Feb. 22, 1949 |
| 2,759,761 | Dandini | Aug. 21, 1956 |
| 2,768,024 | Spear | Oct. 23, 1956 |
| 2,768,025 | Spear et al. | Oct. 23, 1956 |
| 2,782,070 | Chaban | Feb. 19, 1957 |

FOREIGN PATENTS

| | | |
|---|---|---|
| 11,727 | Great Britain | 1847 |